E. MEITNER.
ASTRONOMICAL INSTRUMENT.
APPLICATION FILED MAY 17, 1917.

1,346,412. Patented July 13, 1920.
3 SHEETS—SHEET 1.

INVENTOR
ELEMER MEITNER
BY
Herbert H. Thompson
ATTORNEY

E. MEITNER.
ASTRONOMICAL INSTRUMENT.
APPLICATION FILED MAY 17, 1917.
1,346,412.
Patented July 13, 1920.
3 SHEETS—SHEET 2.
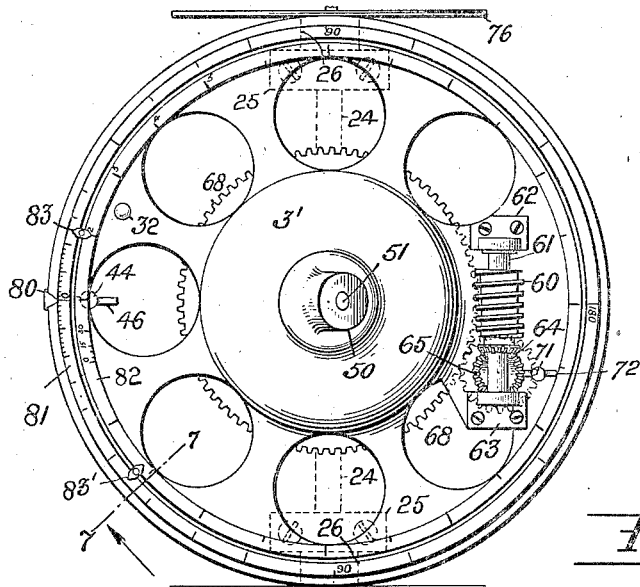
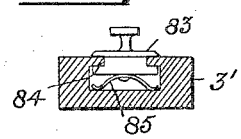
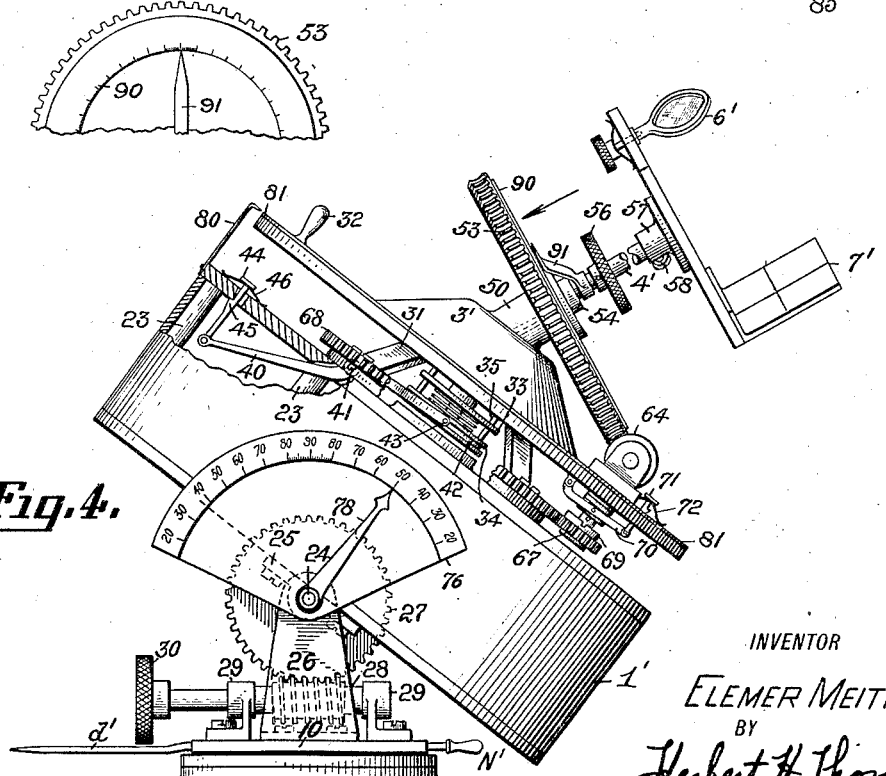
INVENTOR
ELEMER MEITNER
BY
Herbert H. Thompson
ATTORNEY.

E. MEITNER.
ASTRONOMICAL INSTRUMENT.
APPLICATION FILED MAY 17, 1917.

1,346,412.

Patented July 13, 1920.
3 SHEETS—SHEET 3.

INVENTOR
ELEMER MEITNER
BY
Herbert H. Thompson
ATTORNEY

UNITED STATES PATENT OFFICE.

ELEMER MEITNER, OF BROOKLYN, NEW YORK.

ASTRONOMICAL INSTRUMENT.

1,346,412. Specification of Letters Patent. Patented July 13, 1920.

Application filed May 17, 1917. Serial No. 169,166.

*To all whom it may concern:*

Be it known that I, ELEMER MEITNER, a subject of the King of Hungary, residing at 138 Montague street, Brooklyn, in the county of Kings and State of New York, have invented certain new and useful Improvements in Astronomical Instruments, of which the following is a specification.

My invention relates to astronomical instruments more particularly to that type of instrument by means of which the location of the point of observation on the earth's surface may be determined by ascertaining the direction in which the sun is with respect to the earth.

One of the principal objects of this invention is to provide such an instrument that direct readings of latitude and longitude may be taken, thus avoiding the necessity of laborious and time consuming calculation and reference to tables.

Another object is to provide an instrument by means of which the direction of the north may be determined by determining the direction of the sun's rays.

Other objects and advantages will appear as the invention is hereinafter disclosed.

Referring to the drawings which disclose what I now consider the preferred form of my invention.

Fig. 3 is a section taken on the line 3—3 of Fig. 1 looking in the direction of the arrows.

Fig. 4 is an elevation of the instrument shown in Fig. 1 with a part of the clock train casing broken away and certain of the parts being in different positions.

Fig. 7 is a section taken on the line 7—7 of Fig. 3, and Fig. 8 is a fragmentary detail of an additional indicating means.

Figures 1, 2:
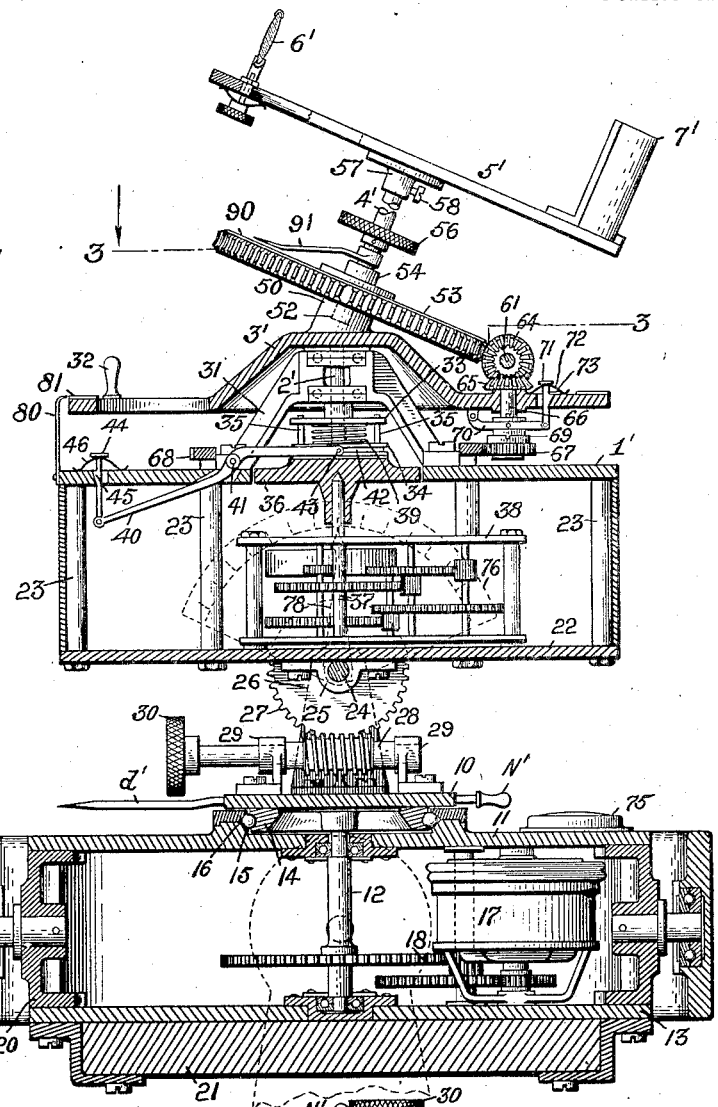
Figure 1 is a sectional elevation of the complete instrument.
Fig. 2 is a detail plan view of certain of the parts illustrated in Fig. 1, the upper and lower parts of the instrument being omitted.
Figure 5:
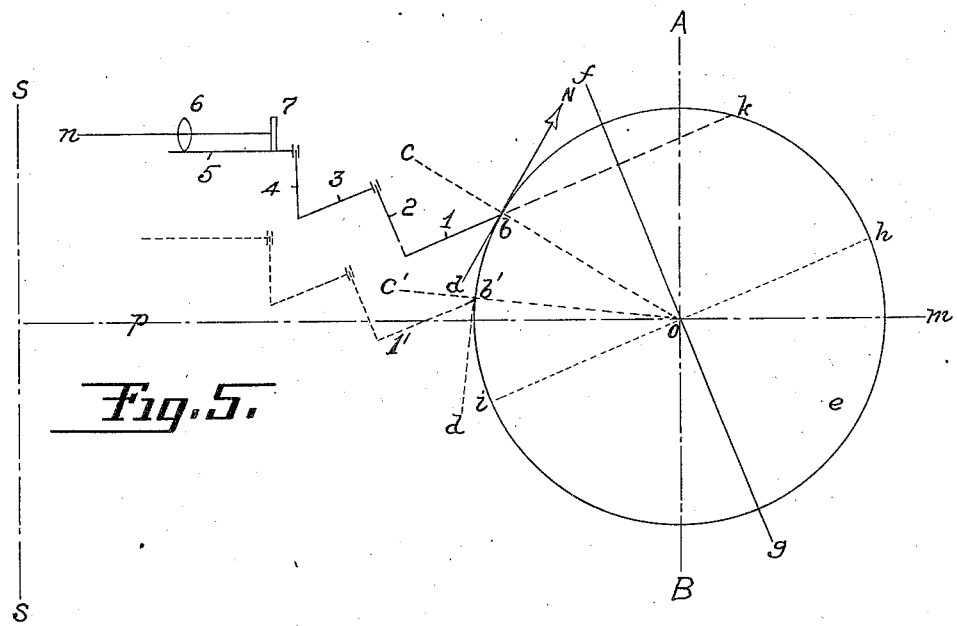
Figs. 5 and 6 are diagrammatic views used in explaining the theory of operation of my invention.
Figure 6:
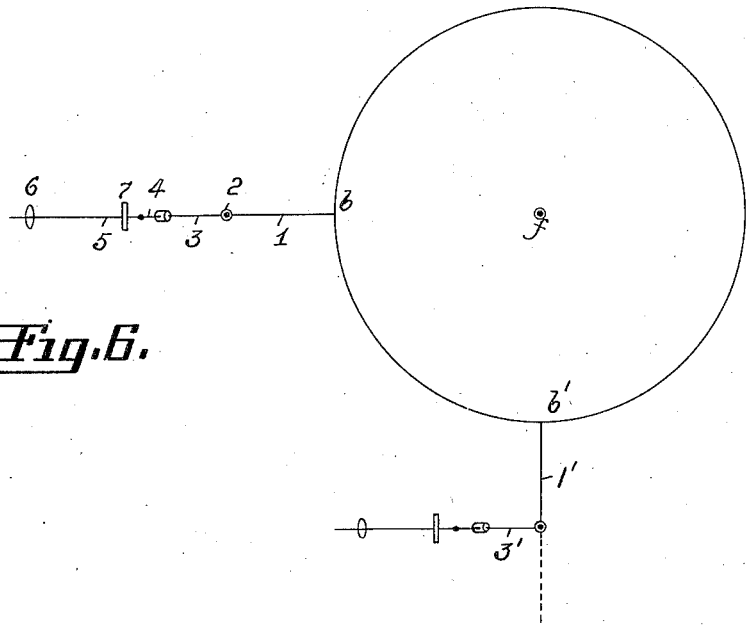

The construction and operation of my invention may best be understood by first considering the diagrams in Figs. 5 and 6. Referring first to Fig. 5 the earth, represented at $e$, rotates about the axis, $f$, $g$, and revolves about the axis S, S of the sun. Let it be assumed that the observer is stationed at $b$, and that there is an instrument made up of elements 1 to 7 inclusive, all of the elements 1 to 5 being in the plane of the paper in Fig. 5. The line $d$ N is the north and south line through the point $b$. The element 2 is perpendicular to the element 1, the latter being perpendicular to the axis $f$, $g$ of the earth. The element 3 is adapted to rotate in a plane perpendicular to the element 2 and the element 5 is adapted to rotate in a plane perpendicular to the element 4. The last named element is connected to the element 3 at such an angle that when the element 1 is perpendicular to the axis $f$, $g$, the said element 4 is parallel to the axis of the sun S, S. It will be obvious that in Fig. 5 the element 5, provided with lens 6 and screen 7, will have its sighting axis parallel to the sun's rays, one of which is represented at $n$, 7. As the line $o$, $i$, is drawn perpendicular to the axis $f$, $g$ the value of the angle $b$, $o$, $i$, is the latitude of the point $b$, and as the angles $c$, $b$, $l$ and $b$, $o$, $i$, are equal the value of the angle $c$, $b$, $l$ is the latitude of the point $b$.

Let us assume, further, that the earth is fixed both with respect to rotation and revolution and that the observer moves to $b'$, and the instrument 1, 2, 3, 4, 5, 6, 7, is shifted bodily to the point $b'$ (Fig. 5). In order to focus the sun's rays on the screen 7 it is necessary that the sighting axis 6—7 be parallel to the sun's rays, and in order to accomplish this the element 1 must be placed at a different angle with respect to the north and south line. Thus the angle $l$, $b$, $d$ has become $l'$, $b'$ $d'$ and the latitude of the new point of observation $b'$ is equal to the angle $c'$, $b'$ $l'$. Thus the latitude of any point on the earth's surface may be determined by measuring the angular distance between the vertical line through the point of observation and the element 1.

Next let us assume that the point of observation is fixed with respect to the earth's surface, that the earth is rotating about its axis but not revolving about the axis S, S of the sun. In Fig. 6 which is a diagrammatic view looking down along the earth's axis from above, the point of observation is at $b$. Let us assume now that the earth rotates through 90°, then the point of observation moves to $b'$ (in Fig. 6). If the parts 1 to 5 inclusive remain unchanged with relation to each other, the sighting axis of the instrument will be exactly at right angles to the sun's rays which are parallel with the line $5^b$. In order to offset the effect due to rotation of the earth about its axis $f, g$ the element 3 should be rotated about the element 2 an amount equal to the angle through which the earth rotates but in an opposite direction. Thus if the element 3 is rotated in a clockwise direction about element 2 once in 24 hours the effect of the earth's rotation about its axis is overcome.

Besides rotating about its own axis the earth revolves about the axis S, S of the sun. This orbit is elliptical, but for all practical purposes may be considered as circular. The earth makes one revolution about the axis S, S in about 365 days, the earth moving in such a manner that the successive positions of the earth's axis are parallel to each other. Therefore, to offset the effect of the earth's revolution about the axis S, S, the element 5 must be rotated about the element 4 about once in 365 days or approximately one degree per day.

Obviously if the point of observation $b$ is fixed with respect to the earth's surface, the angle $c, b, l$ made equal to the latitude, the element 3 rotated about element 2 at the rate of one revolution in 24 hours and the element 5 rotated about the element 4 about once in 365 days, the sighting axis 6—7 will remain parallel to the sun's rays which position will be indicated by the position of the sun spot on the screen 7 being fixed. If the point of observation is now moved in such a manner that the latitude is changed but not the longitude the new latitude can be readily determined by adjusting the element 1 so as to bring the sun spot back on the original spot on the screen 7. The angle $c, b, l$ will then give the new latitude. In the assumption last made the element 1 would be adjusted about its horizontal axis.

If the point of observation had been moved in such a manner as to change the longitude instead of the latitude as above the element 1 would not be adjusted about its horizontal axis in the new position but the element 3 would have to be adjusted about the axis 2 to a position other than that necessary to offset the effect of the rotation of the earth. This is due to the fact that movement along a latitude line adds, algebraically, to the effect produced by the rotation of the earth. Obviously the amount of angular displacement given the element 3 about element 2 (after said element 3 has been adjusted to offset the effect of the rotation of the earth about its axis $f, g$) in order to return the sun spot to its original position on the screen 7, is equal to the difference in longitude between the original and the new points of observation.

It is apparent from the preceding explanation that, if at any point on the earth's surface the sun spot is on a predetermined fixed spot on the screen 7, the line $d$ N will lie in a north and south position, the angle $c, b, l$ will be equal to the latitude of the new position, and the change in angular position of the element 3 about element 2, other than that necessary to offset the effect of the rotation of the earth, will equal the difference in longitude between the former and present points of observation.

Viewed from a generic aspect my invention embraces any suitable mechanism for embodying and utilizing the above described principles and theory of operation, and Figs. 1 to 4 inclusive are merely indicative of one physical embodiment my invention may assume.

The instrument illustrated in the last mentioned figures comprises elements $N', d', 1', 2', 3', 4', 5', 6'$ and $7'$ corresponding to elements N, $d$, 1, 2, 3, 4, 5, 6 and 7 in Figs. 5 and 6, respectively.

The element $d', N'$ shown in the form of a pointer is provided with means for adjusting it to a north and south position. This means may take the form illustrated, the said element $d', N'$ being shown in the form of a pointer $d'$ and a handle $N'$ mounted on a platform 10 which platform is rotatably connected with the plate 11. This rotatable connection may take the form illustrated in which the platform 10 is rigidly connected to a shaft 12 suitably journaled in the top plate 11 and a similar bottom plate 13. The platform 10 may also be provided with a trackway 14 adjacent its periphery adapted to engage balls 15 rotatable in a race 16 provided on the plate 11. Preferably, means are provided to position the element $d', N'$ in a north and south direction automatically. Such means may take the form of a repeater motor 17 adapted to be connected to a main or master compass in any well-known manner, such a system being disclosed in the British patent to E. A. Sperry No. 15,679, accepted July 5, 1912, gyro navigation apparatus. The repeater motor 17 is suitably connected to the shaft 12 to rotate the latter, as by means of gearing designated generally at 18. In the event that the repeater system should become inoperative or if for any other reason it is desired to dispense with the operation of the element $d', N'$ by the repeater motor 17, the said element $d', N'$ may be rotated manually by the handle $N'$.

As will appear later it is desirable to have the platform 10 in a horizontal position when the readings are taken. This may be accomplished by mounting the plates 11 and 13 on the inner of two suitably supported cardan rings 19 and 20 and by providing a weight 21 secured to the lower plate 13.

The disk $1'$ should be adjustable about an axis at right angles to the line $d', N'$ for a reason pointed out in connection with the elements 1 and $d$, N. This adjustment may be accomplished by the mechanism illustrated in which the disk 1' is secured to and carried by a similar disk 22 through the rods 23. The last mentioned disk is shown as secured to a shaft 24 by a clamp 25. The shaft 24 is shown as being rotatably mounted in journal brackets 26 suitably secured to the platform 10. The means for adjusting the angular position of the plane of the disk 1' with respect to the line $d'$, $N'$, may assume the form of a worm gear 27 secured to the shaft 24 and adapted to be rotated by a worm 28 suitably journaled as by means of journal brackets 29, 29 secured to the platform 10. The worm 28 may be provided with a thumb nut 30 for turning the same.

The platform 3' is rotatably connected with the disk 1'. Such connection may take the form of a shaft 2' secured to the platform 3' and journaled in a bifurcated bracket 31 secured to the platform 1'. A handle 32 may be secured to the platform 3' for manually rotating the same. Although the platform 3' may be manually rotated I prefer in addition to rotate it automatically in a direction opposite to that of the earth and at a rate of one complete rotation in 24 hours.

One form of mechanism for accomplishing the last mentioned function is illustrated in the drawings and is constructed substantially as follows: The shaft 2' has fixed thereto a disk 33 and slidably mounted thereon a friction clutch disk 34. While the last mentioned disk is slidable on the shaft 2', means are provided for preventing relative rotation between these members. Such means may take the form illustrated, in which pins 35 carried by disk 34 extend through and are slidable in the disk 33. The other member 36 of the friction clutch is mounted on a shaft 37 adapted to be rotated by any suitable means, such as a clock train designated generally at 38, at the rate of one rotation in 24 hours and in a direction opposite to the earth's rotation about its axis. A spring 39 may be provided between the two clutch disks 34 and 36 to aid gravity in holding these disks in frictional engagement.

As the shaft 2' is connected to the shaft 37 merely by friction it is obvious that the platform 3' is rotatable manually, by means of the handle 32, independently of the clock train 38. It is preferable, however, to provide means for allowing the platform 3' to rotate freely with respect to the clock train 38 when it is desired to move the former manually. Such means may assume the form of a lever 40 pivoted at 41 with respect to the frame 1', provided at one end with a push-rod 44 and at its other end with pins 43 loosely mounted in a slot 42 of the disk 34. The push-rod 44 may be provided with a shoulder 45 adapted to engage the under surface of plate 1' to hold the clutch parts in the disengaged position. A spring 46 may also be provided to prevent the push-rod from being accidentally displaced.

The shaft 4' is revolubly mounted with respect to the axis of the shaft 2' and rotatable about its own axis, the angle between the axes 2' and 4' being constant and equal to the angle between the axes of the earth and sun. The means for mounting the axis 4' as above indicated may assume the form illustrated in which the platform 3' is provided with a hub 50 provided with a hole 51 in which the stub-shaft 52 is rotatably mounted. The stub-shaft 52 terminates in an enlarged portion 54 in which the shaft 4' is frictionally mounted. Thus the last mentioned shaft, while free from the danger of accidental rotation with reference to the member 54, is capable of rotation with respect to the last mentioned member if actuated, as by means of a knurled thumb-nut 56 secured to said shaft 4'.

Automatic means although not essential may also be provided for rotating the shaft 4' about its own axis. This means is designed to cause automatically one rotation of the shaft 4' about its own axis, in about 365 days and may assume the form of a train of gearing connected to the shaft 4' and driven from the clock train 38. This train of gearing is shown as comprising a worm gear 53 fixedly mounted on the stub-shaft 52 and in engagement with a worm 60 provided on a shaft 61 suitably journaled in journal brackets 62 and 63 mounted on the platform 3'. The shaft 61 has fixed thereon a bevel gear 64 engaging a bevel gear 65 fixed on a shaft 66 journaled in the platform 3'. The last mentioned shaft has loosely mounted thereon a gear wheel 67 shown as engaging a large gear 68 fixed to the disk 1'. The gear 67 is adapted to be coupled to the shaft 66 to rotate the same by means of a clutch 69. Suitable means are provided for making and breaking the clutch connection 69, such means being shown as a lever 70 pivoted at one end on the platform 3', connected at its middle portion to the clutch, in a manner similar to the connection between lever 40 and disk 34, and provided at its free end with a push rod 71. The last mentioned element and its spring 72 may be in all respects identical to the push-rod 44 and spring 46 except that the shoulder of the rod 71, instead of taking under the lower face of platform 3', is adapted to engage a plate 73 provided on the top of said platform 3'.

The sighting instrument 5' may be of any suitable type adapted to indicate or make determinable the position of the instrument in which the sighting axis is parallel to the sun's rays. The instrument illustrated comprises a slightly curved screen 7' fixed to the base 5' and a lens 6' slidable along said base 5'. By sliding the lens along the base the sun's rays may be focused upon the screen 7'. The base 5' may be attached to the shaft 4' by means of a hub 57 adjustably secured to the shaft by means of a set screw 58.

While I am aware that the inner ring 20 could be gyroscopically stabilized in any suitable manner, as for example, in the manner in which the inner ring of the British patent to the Sperry Gyroscope Company, No. 10,255 of 1915, is stabilized, I have shown only a weight 21 to maintain the plate 11 horizontal in order to avoid unnecessary complication of the drawing. A level 75 may be provided to indicate when the plate 11 is horizontal.

As the angle between the plate 1' and a plane perpendicular to the line $d'$, $N'$ is equal to the latitude under certain conditions suitable means are provided for indicating the value of this angle. Such means may assume the form of scales 76, and 77 fixed to the brackets 26, 26 and pointers 78 and 79 fixed to the shaft 24 in such a manner that when the plates 1' and 11 are parallel the pointers indicate 90° on the scales. Each scale is calibrated in degrees on each side of the 90° as indicated clearly in Fig. 4.

The means for indicating longitude may take the form of a pointer 80, secured to the plate 1', coöperating with a scale 81 provided on the platform 3'. This scale is preferably divided into degrees and fractions thereof. An additional scale 82 and a sliding indicator while not indispensable add to the convenience of operation under certain conditions as will hereinafter appear. The scale 82 is preferably divided into hours and minutes, the whole circumference representing 24 hours. The sliding indicator may take the form as illustrated clearly in Fig. 7 in which the indicator 83 is slidably mounted in an undercut channel 84 provided in the platform 3'. The indicator 83 may be provided with a spring 85 to hold it by friction in whatever position it is adjusted to. An additional indicator 83' may be provided identical to the indicator 83.

The worm gear 53 may be provided on its upper surface with a scale 90 (see Fig. 8) with which a pointer 91 frictionally connected to the shaft 4', is adapted to coöperate. The scale 90 extends completely around the gear 53 and is made up of 365 equal subdivisions or points.

The operation of the specific form of instrument shown will be readily understood from the following brief description in view of the explanation of the theory in the first part of this specification.

Let it be assumed that for some reason it is desirable to operate the entire instrument manually. In this event the repeater motor 17 is idle and the clutches 34 and 69 in the open position, as illustrated in Fig. 4. The instrument is adjusted at some place of known longitude, and time with the plane 11 horizontal and the pointer $d'$ directed toward the north, until the sun spot is brought to some predetermined position on the screen 7', for example the intersection of the cross-hairs on said screen. When the parts have been so adjusted one of the indicators 83' is moved to a point on the scale 81 corresponding to the known longitude and the other indicator 83 is adjusted to coincide with the pointer 80. Suppose that the instrument is now moved to a new position on the earth's surface of unknown latitude and longitude, and in which the direction of the north pole is also unknown, but in which the time taken to reach this new point is known. For example, suppose this time is two days and six hours. The shaft 4' is rotated by means of the nut 56 in a direction the same as the direction of revolution of the earth around the sun and in extent equal to two sub-divisions on the scale 90. The indicator 83 is now moved a distance equal to six hours as indicated on the scale 82 in a direction the same as that of the rotation of the earth about its own axis. The instrument is next adjusted by means of handles $N'$ and 32 and thumb-nut 30 to a position when the sun spot is on the cross-hairs of the screen 7'. The angular distance between the pointer 80 and the index 83 on the scale 81 is the difference in longitude between the two places of observation. By shifting the index 83' an amount equal to this last mentioned reading a direct reading of longitude of the new point of observation is indicated on scale 81 by said index 83'. Furthermore the pointer $d'$ will be pointing toward the north and the reading on each of scales 76 and 77 is the latitude of the new point of observation.

The above operation is greatly simplified and facilitated by employment of the various automatic means disclosed. Thus if the repeater motor is properly connected and in operation the line $d'$, $N'$ will be automatically positioned in a north and south direction so that it is not necessary to adjust the instrument manually by means of the handle $N'$.

The operation is further simplified by throwing the clutch 42, 43 in, in the interval between readings, and still further simplified by throwing the clutch 69 in also. The operation with the repeater motor and clock work in use would be substantially as follows:

With the clutches 42—43 and 69 in open position, the device is so adjusted that the sun spot is brought on the cross-hairs, or some other predetermined spot of the screen 7'. The clutches 42—43 and 69 are then thrown in. Suppose that the instrument is now moved to a new point, as by travel of a ship on which the device may be mounted, and that the latitude and longitude of this new point are desired. Both clutches 42—43 and 69 are thrown out, the index 83 having, first, been manually moved to coincide with pointer 80. The instrument is then adjusted by means of handles 32 and 30 until the sun spot is on the cross-hairs. The reading on either of scales 76 or 77 gives the latitude and the angular distance between index 83 and pointer 80 measured on the scale 81 gives the difference of longitude between the new point of observation and the old. If it is desired to get a direct reading of longitude the index 83' is placed in a position, with reference to scale 81, indicative of the longitude of the former observation point, the index 83, if moved to a position away from 83' a number of degrees, or fractions thereof, equal to the difference in longitude (read as indicated above) between the two points of observation, will indicate the longitude of the new point. The readings may be taken very quickly and after the spot has been focused at any point of observation the clutches are thrown back in until the next readings are taken. Although, in describing my invention, I have stated that the sighting device is placed in a predetermined position with relation to the sun or sun's rays it is to be understood that any heavenly body, fixed with relation to the sun, could be utilized instead of or in conjunction with the latter, thus adapting the invention for use at night as well as by day.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an astronomical instrument, in combination, a sighting instrument, means connected to said sighting instrument for positioning the latter with its sighting axis in a predetermined relation to the rays from a heavenly body and means connected to said sighting instrument for indicating the longitude of the point of observation when said sighting instrument is so positioned.

2. In an astronomical instrument, in combination, a sighting instrument, means connected to said sighting instrument for positioning the latter with its sighting axis in a predetermined relation to the rays of a heavenly body, means for indicating the latitude of the point of observation when said sighting instrument is so positioned and means for indicating the longitude of the point of observation when said sighting instrument is so positioned.

3. In an astronomical instrument, in combination, a universally mounted sighting instrument, means for adjusting said sighting instrument to a position where the sighting axis is parallel to the sun's rays and means for indicating the longitude of the point of observation when said sighting axis is parallel to the sun's rays.

4. An astronomical instrument comprising a member adapted to be placed in a north and south position, a second member adjustable about an axis at right angles to the plane of the meridian when said first mentioned member is placed in its north and south position and a rotatable sighting instrument connected to said members, the axis of rotation of said sighting instrument being parallel to the axis of the sun when the axis of said second member is perpendicular to the plane of the meridian and said second member is adjusted to correspond to the latitude of the point of observation.

5. In an astronomical instrument, in combination, a sighting device mounted for rotation about an axis, and for revolution about another axis at an angle to the first axis, means for positioning said axis of revolution parallel to the axis of the earth and means for indicating the angular displacement of said device about its axis of revolution necessary to maintain its sighting axis parallel to the sun's rays when moving from one point of observation to a second point of different longitude.

6. In an astronomical instrument, in combination, a sighting device mounted for rotation about an axis and for revolution about another axis at an angle to the first axis, means for positioning said axis of revolution parallel to the axis of the earth, means for adjusting said device to a position in which its sighting axis is parallel to the sun's rays and means for maintaining said device in said position so long as the point of observation is unchanged with reference to the earth.

7. In an astronomical instrument, in combination, a sighting device mounted for rotation about an axis and for revolution about another axis at an angle to the first axis, means for positioning said axis of revolution parallel to the axis of the earth, means for adjusting said device to a position in which its sighting axis is parallel to the sun's rays and time-controlled means for maintaining said device in said position so long as the point of observation is unchanged with reference to the earth.

8. In combination, a support, a sighting instrument connected to said support, means for adjusting said sighting instrument to a position in which its sighting axis is parallel to the sun's rays, means for maintaining said sighting instrument in such position so long as the point of observation is stationary with respect to the earth, and means connected to said instrument for indicating the longitude of the point of observation when said sighting axis is parallel to the sun's rays.

9. In combination, a support, a sighting instrument connected to said support, means for adjusting said sighting instrument to a position in which its sighting axis is parallel to the sun's rays, time-controlled means for maintaining said sighting instrument in such position so long as the point of observation is stationary with respect to the earth, and means connected to said instrument for indicating the longitude of the point of observation when said sighting axis is parallel to the sun's rays.

10. In combination, a support, a sighting device connected to said support, means for adjusting said sighting device to a position in which its sighting axis is parallel to the sun's rays and means for revolving said device at a rate equal to that of the rotation of the earth about its axis.

11. In an astronomical instrument, in combination, a support, a sighting device connected to said support, and means for rotating said device with respect to its support at a rate equal to the rate of revolution of the earth about the sun.

12. In an astronomical instrument, in combination, a support, a sighting device connected to said support and means for revolving said device, with respect to its support, at a rate equal to the rate of rotation of the earth about its axis.

13. In an astronomical instrument, in combination, a sighting device, means for revolving said device about an axis, means for revolving said device about a second axis perpendicular at all times to said first axis, and means for maintaining said second axis at right angles to the plane of the meridian through the point of observation.

14. In an astronomical instrument, in combination, a sighting device, means for revolving said device about an axis, means for revolving said device about a second axis, and compass-controlled means for maintaining said second axis at right angles to the plane of the meridian through the point of observation.

15. In combination, a support, a platform mounted on said support for rotation with respect thereto about axes at right angles to each other, means for indicating the angle between one of said axes and said platform and an indicator mounted on said platform for rotation about an axis at a definite acute angle to said platform.

16. In combination, a universally mounted support, means for maintaining said support in a horizontal position, a platform rotatably mounted on said support, means adapted to be connected to a master compass for placing said platform in a predetermined position with reference to the meridian through the point of observation, a plate pivoted to said platform about a normally horizontal axis, angle indicating means connected to said plate and to said platform, a shaft mounted on said plate, a clock train for rotating said shaft, means for making or breaking the connection between said clock-train and shaft, a second shaft carried by said first shaft at an angle thereto, and an indicator mounted on said second shaft.

17. In an astronomical instrument, a support, a shaft rotatably mounted on said support, a clock-train for rotating said shaft, means for making or breaking the connection between said clock-train and shaft, an indicator mounted for rotation about an axis at an acute angle to said shaft, a driving connection between said clock-train and indicator and means for making or breaking said last mentioned connection.

18. In an astronomical instrument, a support, a shaft rotatably mounted on said support, a clock-train for rotating said shaft, means for making or breaking the connection between said clock-train and shaft, an indicator mounted for rotation about an axis at an acute angle to said shaft, a driving connection between said clock-train and indicator, means for making or breaking said last mentioned connection, and means for manually rotating either or both of said shaft and device when said clock-train is disconnected.

19. In combination, a platform mounted for rotation about an axis, means for supporting said platform in a position in which said axis of rotation is parallel to the axis of the earth and power means connected to said platform for rotating the same.

20. In combination, an optical device, means supporting said device for rotation about an axis and means supporting said device for revolution about a second axis at a fixed angle to said first mentioned axis equal to the angle between the axes of rotation and revolution of the earth.

21. In an astronomical instrument, a sighting device rotatable about an axis, and means for maintaining said axis at right angles to the plane of the meridian through the point of observation.

22. In an astronomical instrument, a sighting device rotatable about an axis, and compass-controlled means for maintaining said axis at right angles to the plane of the meridian through the point of observation.

In testimony whereof I have affixed my signature.

ELEMER MEITNER.